US005399424A

United States Patent [19]

Rommelmann et al.

[11] Patent Number: 5,399,424

[45] Date of Patent: Mar. 21, 1995

[54] FIBRILLATED PULTRUDED ELECTRONIC COMPONENT

[75] Inventors: Heiko Rommelmann, Webster; Allen J. Thompson, Akron, both of N.Y.

[73] Assignee: Xerox Corporation, Stamford, Conn.

[21] Appl. No.: 73,001

[22] Filed: Jun. 7, 1993

Related U.S. Application Data

[62] Division of Ser. No. 997,424, Dec. 28, 1992, Pat. No. 5,282,310.

[51] Int. Cl.$^{6}$ .......... B32B 9/00

[52] U.S. Cl. .......... 428/295; 428/292; 428/294

[58] Field of Search .......... 428/295, 292, 294

[56] References Cited

U.S. PATENT DOCUMENTS

| | | | |
|---|---|---|---|
| 4,347,287 | 8/1982 | Lewis et al. | 428/378 |
| 4,369,423 | 1/1983 | Holtzberg | 338/66 |
| 4,569,786 | 2/1986 | Deguchi | 252/503 |
| 4,841,099 | 6/1989 | Epstein et al. | 174/68.5 |

*Primary Examiner*—Patrick J. Ryan
*Assistant Examiner*—Kam F. Lee
*Attorney, Agent, or Firm*—Fay, Sharpe, Beall, Fagan, Minnich & McKee

[57] ABSTRACT

A method for manufacturing a fibrillated pultruded electronic component includes the steps of providing a rod comprising a plurality of conductive fibers embedded in a matrix material, the rod having a first end and a second end. The rod is rotated and a liquid is sprayed onto the rod at a distance from the first end of the rod. The matrix material is abraded away from between the fibers of the rod. The fibers of the rod are then cut. A disk is formed which has a plurality of conductive fibers embedded in a matrix material. However, the ends of the disk include only the conductive fibers and not the matrix material. This enables the ends of the disk to have a fibrillated brush-like structure which is particularly well suited for low energy electronic/microelectronic signal level circuitry typified by contemporary digital and analog signal processors.

20 Claims, 4 Drawing Sheets

FIG. 2
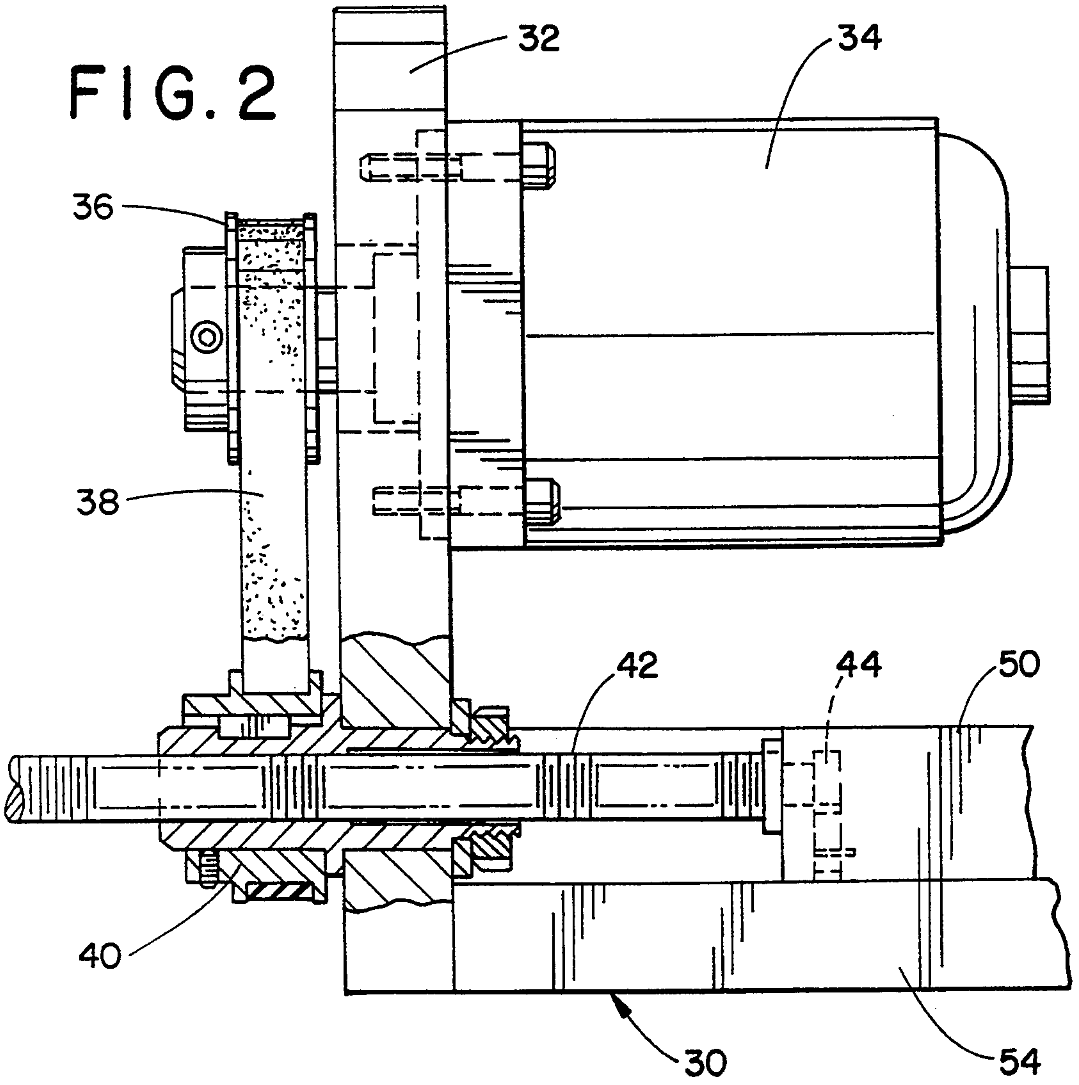
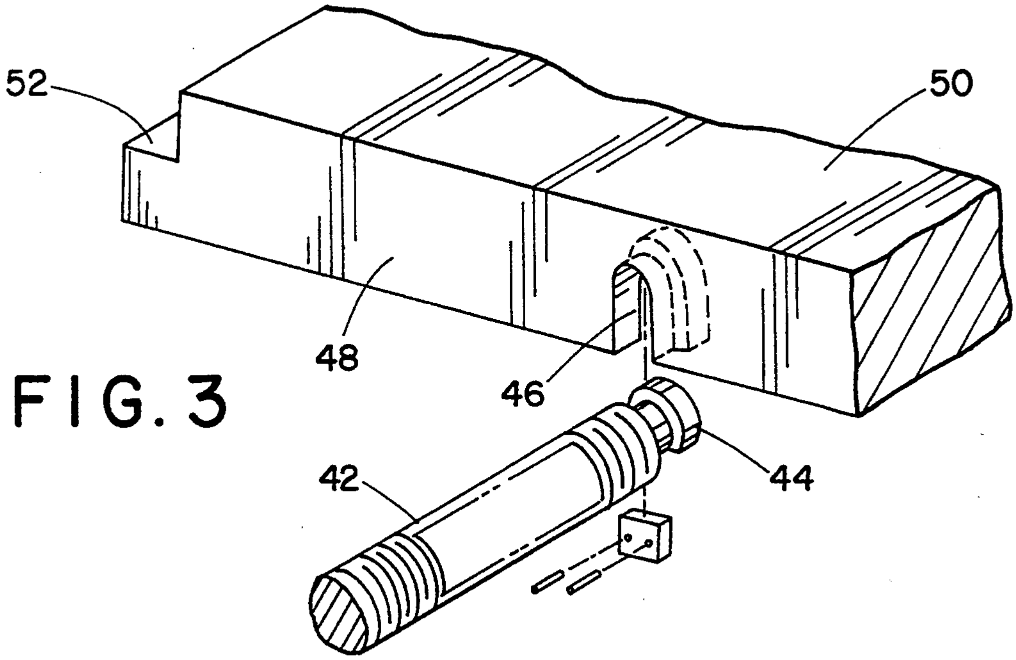
FIG. 3

FIBRILLATED PULTRUDED ELECTRONIC COMPONENT

This application is a divisional of U.S. patent application Ser. No. 07/997,424, filed on Dec. 28, 1992, which issued as U.S. Pat. No. 5,282,310 on Feb. 1, 1994.

CROSS REFERENCE TO RELATED APPLICATIONS

Attention is directed to U.S. application Ser. No. 07/272,280 filed Nov. 17, 1989 in the name of Swift et al. and entitled "Pultruded Electrical Device" now abandoned. A Continuation-in-Part of that application, application Ser. No. 806,061 filed Dec. 11, 1991 matured into U.S. Pat. No. 5,139,862 dated Aug. 18, 1992. Attention is also directed to co-pending U.S. application Ser. No. 07/276,835 entitled "Machine with Removable Unit Having Two Element Electrical Connection" in the name of Ross E. Schroll et al. filed Nov. 25, 1988 and which issued as U.S. Pat. No. 5,177,529 on Jan. 5, 1993. Attention is further directed to co-pending U.S. application Ser. No. 07/806,062 entitled "Fibrillated Pultruded Electronic Component" in the name of Thomas E. Orlowski et al. filed on Dec. 11, 1991. All of the above identified applications are commonly assigned to the assignee of the present invention.

BACKGROUND OF THE INVENTION

The present invention relates generally to electronic components such as connectors, switches and sensors for conducting electrical current. More particularly, the invention relates to a method for manufacturing such components.

Electronic components in the form of a pultruded composite member having a plurality of small generally circular cross section conductive fibers embedded in a polymer matrix, where the fibers are oriented in a direction parallel to the axial direction of the member and are continuous from one end of the member to the other end of the member so as to have a fibrillated brush-like structure are known. The devices described are particularly well suited for low energy electronic/microelectronic signal level circuitry typified by contemporary digital and analog signal processing practices. Typical of the types of machines which may use such electronic devices are electrostatographic printing machines.

In electrostatographic printing apparatus commonly used today, a photoconductive insulating member is typically charged to a uniform potential and thereafter exposed to a light image of an original document to be reproduced. The exposure discharges the photoconductive insulating surface in exposed or background areas and creates an electrostatic latent image on the member which corresponds to the image contained within the original document. Alternatively, a light beam may be modulated and used to selectively discharge portions of the charged photoconductive surface to record the desired information thereon. Typically, such a system employs a laser beam. Subsequently, the electrostatic latent image on the photoconductive insulating surface is made visible by developing the image with developer powder referred to in the art as toner. Most development systems employ developer which comprises both charged carrier particles and charged toner particles which triboelectrically adhere to the carrier particles. During development, the toner particles are attracted from the carrier particles by the charged pattern of the image areas of the photoconductive insulating area to form a powder image on the photoconductive area. This toner image may be subsequently transferred to a support surface such as copy paper to which it may be permanently affixed by heating or by the application of pressure.

In commercial applications of such products, the photoconductive member has typically been configured in the form of a belt or drum moving at high speed in order to provide high speed multiple copying from an original document. Under these circumstances, the moving photoconductive member must be electrically grounded to provide a path to ground for all spurious currents generated in the electrostatographic process. This has typically taken the form of a ground strip on one side of the photoconductive belt or drum which is in contact with a grounding brush made of conductive fibers. Some brushes suffer from a deficiency in that the fibers are thin in diameter and brittle and therefore the brushes tend to shed. This can cause a problem in particular with regard to high voltage charging devices in automatic reproducing machines. If a shed conductive fiber comes into the contact with the charging wire, it has a tendency to arc causing a hot spot on the wire resulting in melting of the wire and breaking of the corotron. This is destructive irreversible damage requiring unscheduled service on the machine by a trained operator. In addition, the fiber can contaminate the device and disrupt uniformity of the corona charging.

Furthermore, in commercial applications of such products, it is necessary to distribute power and/or logic signals to various sites within the machine. Traditionally, this has taken the form of utilizing conventional wires and wiring harnesses in each machine to distribute power and logic signals to the various functional elements in an automated machine. In such distribution systems, it is necessary to provide electrical connectors between the wires and components. In addition, it is necessary to provide sensors and switches, for example, to sense the location of copy sheets, documents, etc. Similarly, other electrical devices such as interlocks, etc. are provided to enable or disable a function.

The most common devices performing these functions have traditionally relied on metal-to-metal contacts to complete the associated electronic circuitry. While this long time conventional approach has been very effective in many applications, it nevertheless suffers from several difficulties. For example, one or both of the metal contacts may be degraded over time by the formation of an insulating film due to oxidation of metal. This film may not be capable of being pierced by the mechanical contact forces or by the low energy (5 volts and 10 milliamps) power present in the circuit. This is complicated by the fact that according to Holm, *Electric Contacts*, page 1, 4th Edition, 1967, published by Springer-Verlag, if the contacts are infinitely hard, no amount of force can force contact to occur in more than a few localized spots. Further, corroded contacts can be the cause of radio frequency interference (noise) which may disturb sensitive circuitry. In addition, the conventional metal to metal contacts are susceptible to contamination by dust and other debris in the machine environment.

In an electrostatographic printing machine, for example, toner particles are generally airborne within the machine and may collect and deposit on one or more such contacts. Another common contaminant in a printing machine is a silicone oil which is commonly used as a fuser release agent. This contamination may also be sufficient to inhibit the necessary metal to metal contact. Accordingly, direct metal to metal contact suffers from low reliability particularly in low energy circuits. To improve the reliability of such contacts, particularly for low energy applications, contacts have been previously made from such noble metals as gold, palladium, silver and rhodium or specially developed alloys such as palladium nickel. For some applications, contacts have been placed in a vacuum or hermetically sealed. In addition, metal contacts can be self-destructive and will burn out since most metals have a positive coefficient of thermal conductivity. Therefore, as the contact spot gets hot due to increasing current densities, it becomes more resistive thereby becoming hotter with the passage of additional current and may eventually burn or weld. Final failure may follow when the phenomena of current crowding predominates the conduction of current. In addition to being unreliable as a result of susceptibility to contamination, traditional metal contacts and particularly sliding contacts, owing to high normal forces, are also susceptible to wear over long periods of time.

Therefore, it has become recently known to provide a non-metallic pultruded composite member having a plurality of small generally circular cross section conductive fibers in a polymer matrix, the fibers being oriented in the matrix in the direction substantially parallel to the axial direction of the member and being continuous from one end of the member to the other to provide a plurality of electrical point contacts at each end of the member with at least one end of the member having a fibrillated brush-like structure such that the plurality of fibers provide a densely distributed filament contact. The terminating ends of the fibers in the brush-like structure define an electrically contacting surface. One of the difficulties with manufacturing such fibrillated pultruded electronic components has been in making thin disk-like elements from a pultruded carbon fiber rod such that the disks can be sized to fit into existing switch packages. Difficulties have been encountered with mechanically cutting the rod into thin disks since the polymer matrix is heated and softened but then recondenses around the ends of the fibers thereby preventing the necessary fibrillated brush-like structure at the end of the disk. Laser cutting of such pultruded carbon fiber rods into thin disks has similarly proven difficult because the fibers conduct heat and the heat burns away the matrix from around the fibers even at distances removed from the plane of the laser cut.

Another reason why cutting such thin disks has been difficult is that while pultruded fibrous structures have a high degree of mechanical strength along the axis of the fibers in the pultrusion, they have poor radial strength and can be readily split or peeled apart. This is especially evident when using such pultruded rods in thin disk form so that they can fit within conventional switch packages. In such a structure, the disk is larger in diameter than in axial height and therefore has poor mechanical strength radially.

Accordingly, it has been considered desirable to develop a new and improved apparatus and process for manufacturing a fibrillated pultruded electronic component as a thin disk or the like which would overcome the foregoing difficulties and others while providing better and more advantageous overall results.

BRIEF SUMMARY OF THE INVENTION

According to the present invention, a method is provided for manufacturing a fibrillated pultruded electronic component.

More particularly, the method comprises the steps of providing a rod comprising a plurality of conductive fibers embedded in a matrix material, the rod having a first end and a second end. A liquid is sprayed onto the rod at a distance from the second end of the rod. The matrix material is abraded away from between the fibers of the rod. The fibers of the rod are then cut. A disk is formed comprising a plurality of conductive fibers embedded in a matrix material.

Preferably, the method further comprises the step of rotating the rod during the steps of spraying, abrading and cutting. Also, preferably a liquid jet fixture is moved transversely across a radius of the rod during the step of spraying the liquid. Preferably, the rod is advanced after the step of cutting and thereafter the steps of rotating, spraying, abrading and cutting are repeated. Preferably, the process further comprises the step of pressurizing the liquid before the step of spraying.

According to another aspect of the present invention, an apparatus is provided for cutting disks from a rod. The apparatus comprises a first fixture for holding a first end of the rod in a rotatable manner, a means for rotating the rod and a second fixture for supporting a second end of the rod in a rotatable and slidable manner. A feeding means is provided for advancing the rod in relation to the second fixture. A liquid jet cutting apparatus is provided for cutting the rod. The liquid jet cutting apparatus is positioned adjacent the second fixture.

Preferably, the liquid jet cutting apparatus comprises a nozzle which sprays a liquid in a stream that impinges on the rod at a location between first and second aligning shafts which comprises the second fixture. Also, the apparatus preferably further comprises a catch basin for the disks which are cut by the liquid jet cutting apparatus. Preferably, a means is provided for advancing the liquid jet cutting apparatus across a radius of the rod during the cutting of the rod.

In accordance with still another aspect of the invention, an electronic component is provided for making electrical contact with another component.

More particularly in accordance with this aspect of the invention, the electronic component comprises a non-metallic pultruded composite member comprising a plurality of small generally circular cross section conductive fibers and a polymer matrix in which the plurality of fibers is embedded. The plurality of fibers is oriented in the matrix in a direction substantially parallel to the axial direction of the member and the fibers are continuous from one end of the member to the other end to provide a plurality of electrical point contacts at each end of the member. A means for providing radial strength to the composite member is also provided.

According to one embodiment of the present invention, the means for providing radial strength comprises a coating applied to an exterior periphery of the member. The coating can comprise a thermoplastic material such as a polyurethane material having a thickness of approximately 1 to 2 mils. Alternatively, the coating can comprise a vinyl ester material having a thickness of approximately 3 to 4 mils. Such a coating can be curable by ultraviolet light if desired. Alternatively, a means for providing radial strength can comprise a jacket of a thermoplastic material.

One advantage of the present invention is the provision of a new and improved method for manufacturing a fibrillated pultruded electronic component for making electrical contact with another component.

Another advantage of the present invention is the provision of a new and improved apparatus for cutting thin disks from a fibrillated pultruded rod.

Still another advantage of the present invention is the provision of a liquid jet apparatus for cutting thin disks, on the order of 30 mils (i.e. 0.030 inches, 0.076 cm), from a rod.

Yet another advantage of the present invention is the provision of a method for cutting thin disks from a rod comprising a plurality of conductive fibers embedded in a matrix material. Such disks are advantageous in that they can be employed in currently utilized switch housings.

A further advantage of the present invention is the provision of an in-line process that improves the radial mechanical properties of thin disks of a fibrillated pultrusion so as to prevent the splitting or peeling apart of a disk of such material.

A still further advantage of the present invention is the provision of a disk of a fibrillated pultruded material which disk has relatively clean ends that consist only of a fibrillated brush-like structure having a densely distributed filament contact.

A yet further advantage of the present invention is the provision of a means for cutting a rod of a pultruded composite member so as to prevent the formation of a crust or a contamination layer on the cut surface of the material.

Still other benefits and advantages of the invention will become apparent to those skilled in the art upon a reading and understanding of the following detailed specification.

BRIEF DESCRIPTION OF THE DRAWINGS

The invention may take form in certain structures and components which will be described in detail in the specification and illustrated in the accompanying drawings which form a part hereof and wherein:

FIG. 2 is a side elevational view, on an enlarged scale, of one end of the apparatus of FIG. 1;

FIG. 3 is an enlarged exploded perspective view of a portion of a sled and a lead screw Of the present invention;

DETAILED DESCRIPTION OF THE EMBODIMENTS

Figure 1:
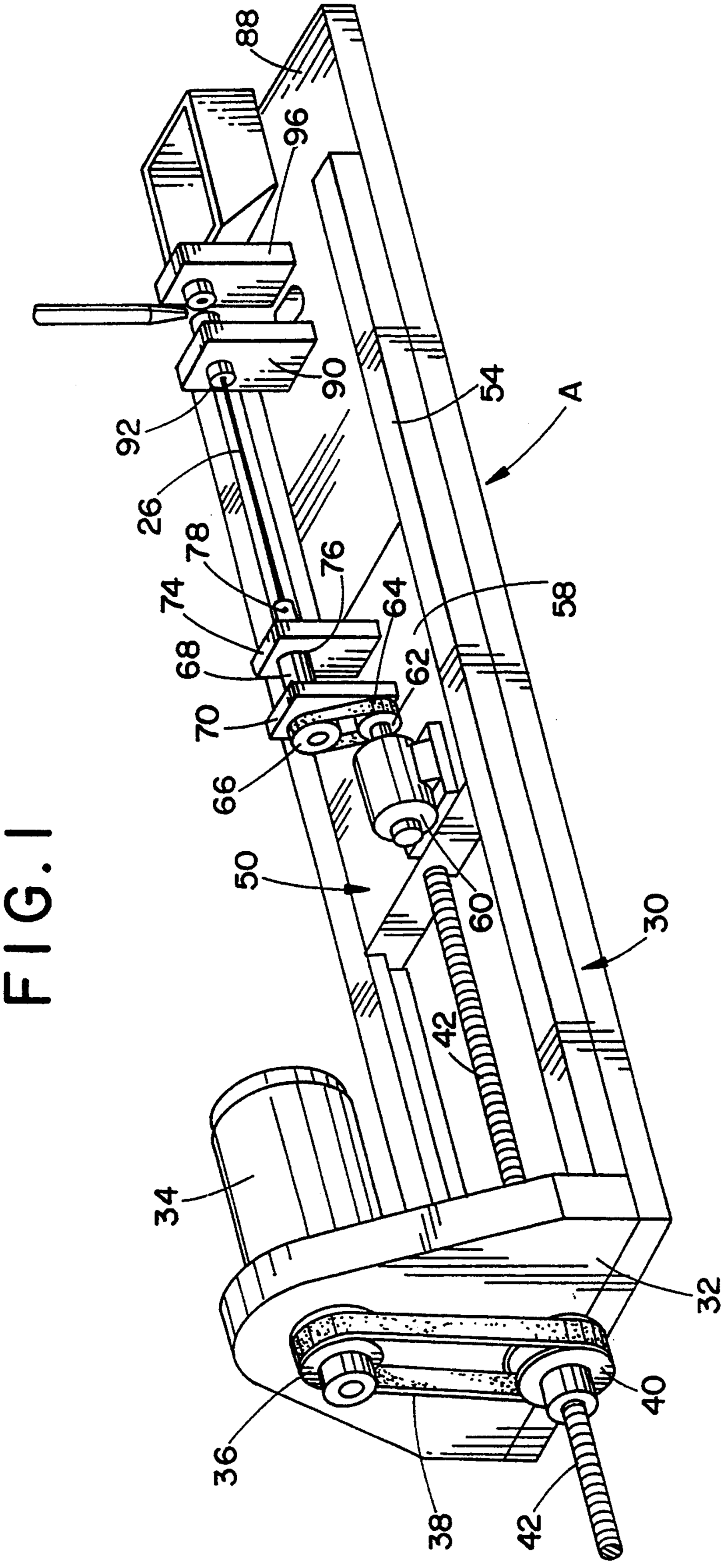
FIG. 1 is a perspective view of an apparatus for cutting disks from a fibrillated pultruded rod according to the present invention.

Referring now to the drawings, wherein the showings are for purposes of illustrating several embodiments of the invention only and not for purposes for limiting same, FIG. 1 shows an apparatus for cutting disks from a fibrillated pultruded rod. While the apparatus is primarily designed for and will hereinafter be described in connection with the cutting of a particular type of rod, it should be appreciated by those of average skill in the art that the apparatus could also be utilized for numerous types of cutting operations.

According to the present invention, an electronic component is made from a pultruded composite member having a fibrillated brush-like structure at one end which provides a densely distributed filament contact with another component. By the term densely distributed filament contact, it is intended to define an extremely high level of contact redundancy insuring electrical contact with another contact surface in that the contacting component has in excess of 1000 individual conductive fibers per square millimeter. In the preferred embodiment, with the use of the liquid jet fixture disclosed in the present invention, the pultruded member can be cut into individual segments or disks and fibrillated in a one step process.

The disks are useful in a variety of electronic devices such as switches, sensors, connectors, interlocks, etc. Typically, these devices are low energy devices, using low voltages within the range of millivolts to hundreds of volts and currents within the range of microamps to hundreds of milliamps as opposed to power applications of tens to hundreds of amperes, for example. These devices are generally electronic in nature within the generic field of electrical devices meaning that their principal applications are in signal level circuits, although as previously stated, they may be used in certain low power applications where their inherent power losses may be tolerated. Furthermore, it is possible for these electronic devices in addition to performing an electrical function to provide a mechanical or structural function.

The pultrusion process generally consists of pulling continuous lengths of fibers through a resin bath impregnator and then into a preforming fixture where the section is partially shaped and excess resin and/or air are removed and then into heated dies where the section is cured continuously. Typically, the process is used to make fiberglass reinforced plastic, pultruded shapes. For a detailed discussion of pultrusion technology, reference is directed to *Handbook of Pultrusion Technology* by Raymond W. Meyer, first published in 1985 by Chapman and Hall, New York. In the practice of the present invention, conductive carbon fibers are submersed in a polymer bath and drawn through a die opening of suitable shape at high temperature to produce a solid piece of dimensions and shapes of the die which can be cut, shaped and machined. As a result, thousands of conductive fiber elements are contained within the polymer matrix whose ends are exposed to surfaces to provide electrical contacts. This high degree of redundancy and availability of electronic point contacts enables a substantial improvement in the reliability of these devices. Since the plurality of small diameter conductive fibers are pulled through the polymer bath and heated die as a continuous length, the shaped member is formed with the fibers being continuous from one end of the member to the other and oriented within the resin matrix in a direction substantially parallel to the axial direction of the member. By the term "axial direction" it is intended to define in a lengthwise or longitudinal direction along the major axis of the configuration during the pultrusion process. Accordingly, the pultruded composite may be formed in a continuous length of the configuration during the pultrusion process and cut to any suitable dimension providing at each end a very large number of electrical point contacts. These pultruded composite members may have either one or both of the ends subsequently fibrillated.

Any suitable fiber may be used in the practice of the present invention. Typically, the conductive fibers are nonmetallic. The teaching of how to manufacture the pultruded rods and how to use pultruded electronic devices can be found in U.S. Pat. No. 5,139,862 issued Aug. 18, 1992 and owned by the assignee of this application. That patent is incorporated herein by reference, in its entirety. While it was stated that the conductive fibers are generally entirely non-metallic, it is conceivable to provide carbon fibers which are plated with nickel or other metals. It may also be possible to utilize metal fibers although this has not yet been attempted.

Figure 7:
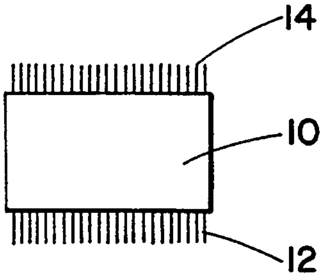
FIG. 7 is a side elevational view of a disk which has been cut from the fibrillated pultruded rod by the apparatus of FIGS. 1–6; and, FIG. 8 is an enlarged cross sectional view through a portion of the disk of FIG. 7.

With reference now to FIG. 7, there is shown a disk 10 after it has been cut by the apparatus of the present invention from a pultruded fibrous rod. It can be seen that the disk has a fibrillated brush-like structure 12, 14 at the two ends thereof which provide a densely distributed filament contact with an electrically contacted surface. With the above described continuous pultrusions, it will be understood that the brush-like structures have a fiber density of at least 1000 fibers/mm$^2$ and indeed could have fiber density in excess of 15,000 fibers/mm$^2$ to provide the high level of redundancy of electrical contact which is desired. It is evident that such a level of fiber density is not capable of being accurately illustrated in FIG. 7.

FIG. 7 does, however, serve to adequately illustrate that the fibers of the brush-like member have a substantially uniform free fiber length and that there is a well defined controlled zone of demarcation between the pultruded and the brush-like sections. The disk is preferably fairly thin, i.e. on the order of 30 mils or 0.03 inches (0.076 cm), including the brush-like end sections 12, 14 while the pultruded carbon fiber rod can have a diameter of 0.073 inches (0.185 cm). Thus, the disk is more than twice as wide as it is thick. Therefore, the brush-like ends 12 and 14 provide a relatively rigid and nondeformable contacting surface. The free fiber length on each end of the disk can be on the order of 3 mils (0.003 inches, 0.0076 cm). Therefore, the length of the pultruded section can be on the order of 24 mils (0.024 inches, 0.061 cm). If desired, the free fiber length can be on the order of 6 mils (0.015 cm).

Figure 8:
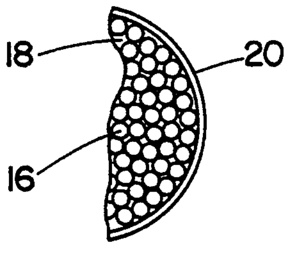

With this component, there will be a minimal deflection of the individual fibers. Such disks find utility in applications requiring stationary or non-sliding contacts such as in switches and microswitches. The structure illustrated in FIG. 7 provides a highly reliable contact providing a great redundancy of individual fibers. Such fibers 16 are illustrated in FIG. 8 with fibers being embedded in a polymer matrix 18 in the pultruded region of the disk 10. It is also evident that an overcoating or surface layer 20 surrounds the disk.

The overcoating 20 is necessary since while pultruded structures have a high degree of mechanical strength along the axis of the fibers in the pultrusion, they have poor radial strength. Therefore, the disk 10 could be readily split or peeled apart since it is evident that the disk is more than twice as large in diameter as it is in axial height. It should be appreciated that the axial height of the disk is greatly exaggerated in the drawing of FIG. 7 in order to illustrate the disk more clearly.

It has, therefore been discovered that overcoating the pultrusion rod will increase the radial strength and thereby permit cutting the requisite disks as thin as is necessary for this environment, i.e. to a thickness of 30 mils, 0.030 inches (0.076 cm). During initial trials, a hand applied epoxy or polyurethane overcoating at a thickness of 1 to 2 mils (0.001 to 0.002 inches, 0.00254 to 0.00508 cm) was utilized and this performed adequately. More recently, an ultraviolet light curable vinyl ester overcoating at a thickness of circa 3 to 4 mils (0.003 to 0.004 inches, 0.007 to 0.0102 cm.) was applied on the pultrusion manufacturing line thereby avoiding secondary coating operations. Such an overcoating has also proven useful. It should, in addition, be appreciated that a jacket or sleeve or the like can be slipped over the carbon fiber pultrusion during the manufacturing process if that is desired.

Figure 5:
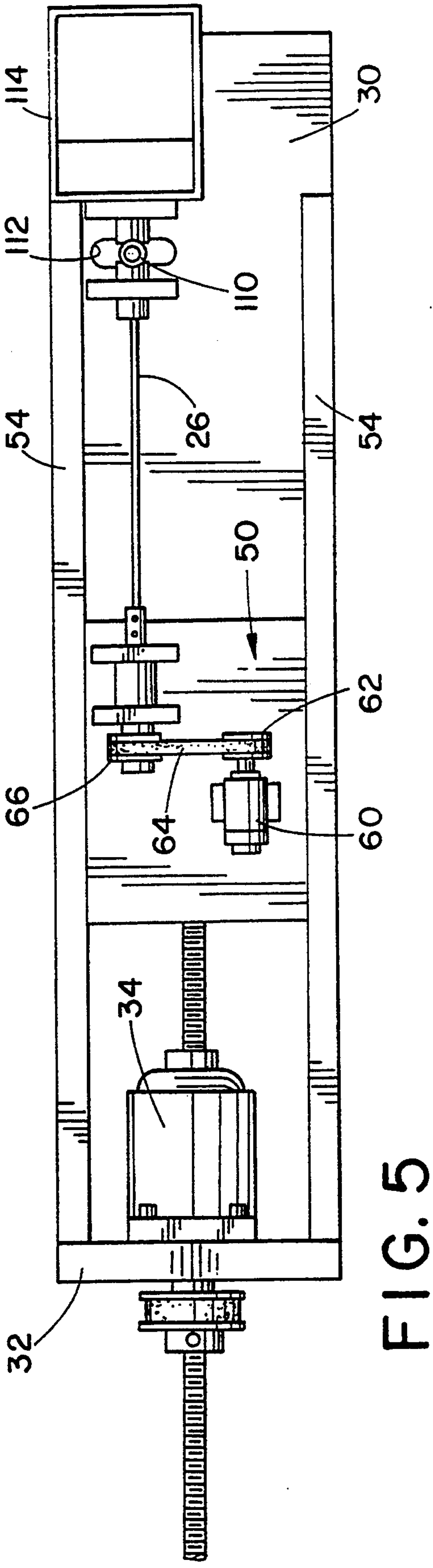
FIG. 5 is a top plan view, on a reduced scale, of the apparatus of FIG. 1.

FIG. 1 illustrates a cutting apparatus which is utilized to cut the disks 10 from a pultruded carbon fiber rod 26. The apparatus comprises a base 30 having thereon an end plate 32 which supports a first motor 34. The first motor is preferably a stepper motor which can be so programmed that one revolution of the motor can be broken into 10,000 incremental steps. As shown in FIG. 2, the motor 34 drives a first pulley 36 which is rotatably mounted thereto. The first pulley in turn drives a belt 38 which is also looped around a second pulley 40 that is mounted on the end plate 32. Extending through the second pulley, and threadedly engaging same, is a lead screw 42. In the preferred embodiment of the invention, the lead screw has approximately 28 threads in one inch (2.54 cm) so that the movement of the lead screw can be very finely controlled by the movement of the motor 34. As seen in FIG. 3, the lead screw has a first end 44 which is rigidly held in a suitable slot 46 located on one end face 48 of a sled 50. The sled includes a pair of stepped side faces 52 which cooperate with suitable stepped runners 54 extending along the two sides of the base 30 so as to mount the sled in a slidable manner on the base. It is evident that through the cooperation of the stepper motor 34 and the lead screw 42, a very finely controlled movement of the sled 50 in relation to the end plate 32 can be obtained as seen in FIG. 5.

Positioned on a sled top surface 58 is a pultrusion revolution controlling motor or second motor 60. This motor drives a first pulley 62 which rotates a belt 64 that is also looped around a second pulley 66. The second pulley also includes a stepped pulley shaft 68 which is mounted on a first support plate 70 and a spaced second support plate 74 by means of suitable aligned apertures such as the aperture 76 illustrated in plate 74. The pulley shaft 68 includes a longitudinally extending bore in which one end of the pultrusion 26 is secured by suitable securing means 78, which may be in the form of a set screw or the like. The pulley shaft bore can be 0.08 inches (0.203 cm) in diameter for a pultruded rod 26 having a diameter of 0.073 inches (0.185 cm).

Figure 4:
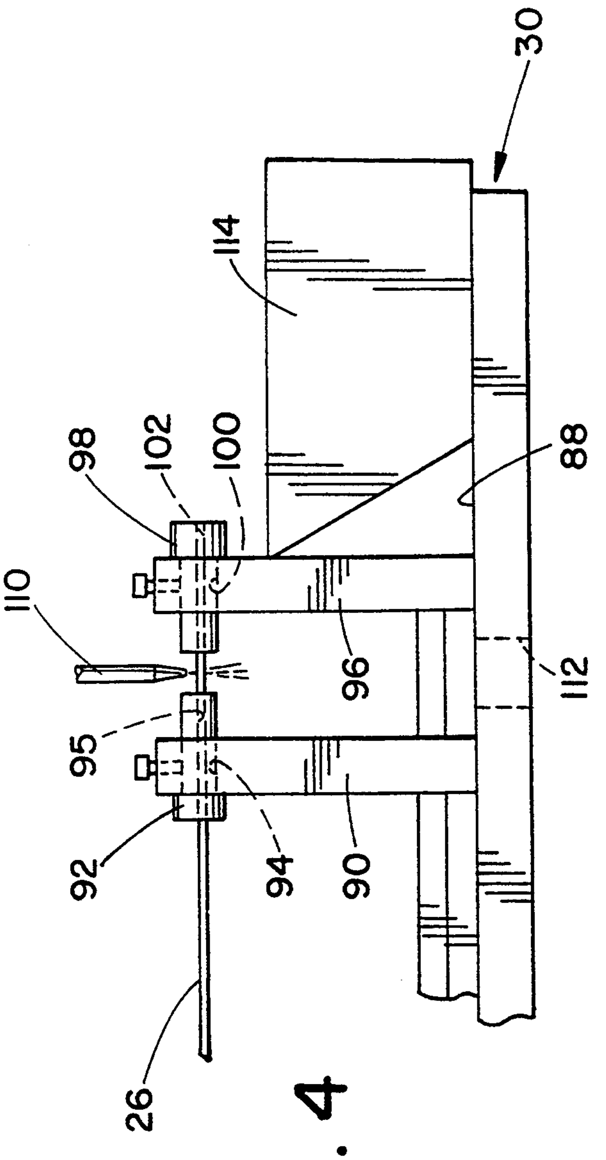
FIG. 4 is a side elevational view on an enlarged scale of another end of the apparatus of FIG. 1.

With reference now to FIG. 4, located on an upper surface 88 of the base 30 in a manner spaced from the plate 32 is a third support plate 90 which carries a first aligning shaft 92. The support plate includes a transverse aperture 94 through which the aligning shaft 92 extends. It is evident that the aligning shaft has a substantially centrally located longitudinally extending bore through which the pultruded rod 26 extends. Also located on the upper surface 88 of the base 30 in a manner spaced from the third support plate 90 is a fourth support plate 96. This plates carries a second aligning shaft 98 which is mounted in a transverse aperture 100 of the plate. The pultruded carbon rod 26 also extends through the second aligning shaft 98 by way of a longitudinal through bore 102. For a rod having a diameter of 0.073 inches (0.185 cm), the through bore can be 0.080 inches (0.203 cm). While the support plates, base and sled can be made from aluminum, the aligning shafts can be made from hardened steel.

The two spaced support plates 90 and 96 support the pultruded carbon rod 26 in a spaced manner so that access can be had between the two plates for a liquid jet nozzle fixture of which only the tip 110 is illustrated. The nozzle is a conventional liquid jet nozzle, preferably a water jet nozzle. The nozzle cuts the disks 10 illustrated in FIG. 7 from the rod 26. As successive cuts are made on the rod 26 as the rod advances, the several disks are held in the through bore 102 and eventually pushed out of the through bore and fall into a catch basin 114 which is also supported on the plate 30 adjacent the fourth support plate 96. The liquid which is sprayed by the nozzle 110 can be exhausted through a suitable opening 112 provided in the base 30.

Figure 6:
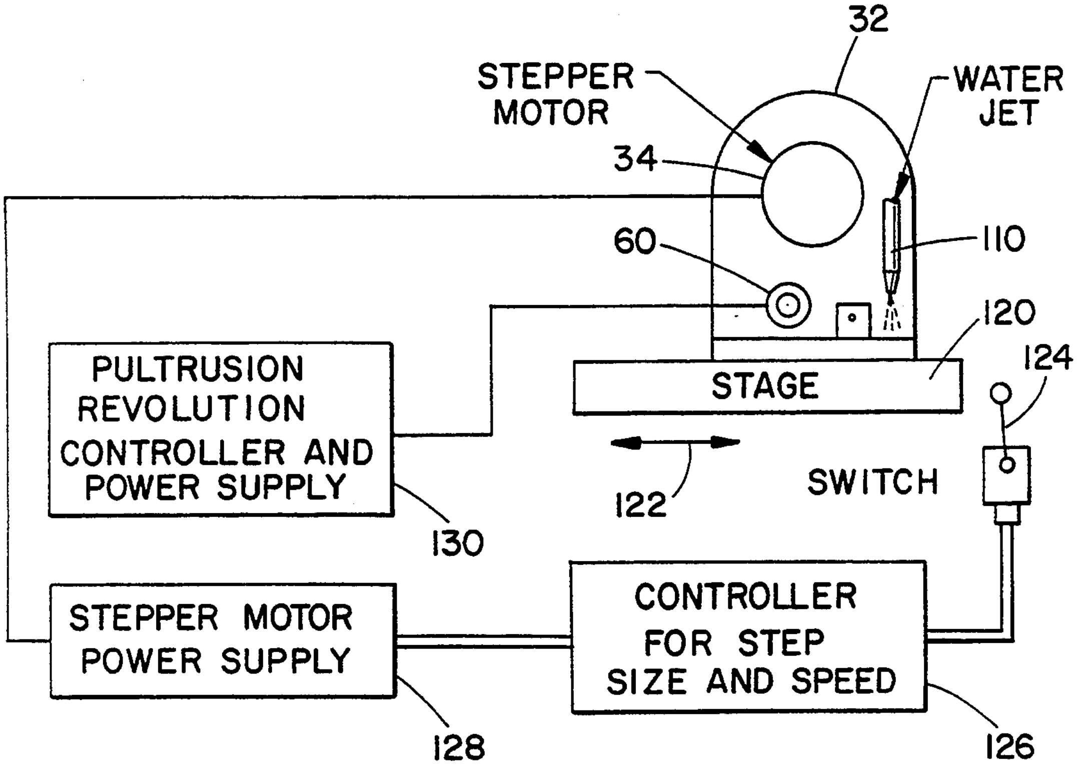
FIG. 6 is a schematic end elevational view on a reduced scale of the apparatus of FIG. 1 as mounted on a stage which reciprocates together with block diagrams of associated circuitry.

With reference now to FIG. 6, the base 30 of the cutting apparatus is supported on, and secured to, a stage 120. The stage 120 is part of a conventionally known water jet cutting apparatus. The stage reciprocates transversely by approximately ½ inch (1.27 cm). The flow of water through the nozzle 110 and the reciprocation of the stage 120 are controlled by a conventionally programmed CNC code in a conventional water jet cutting apparatus. As shown by the arrow 122, the stage reciprocates laterally so that it eventually trips an ordinary low voltage switch 124. The switch 124 is wired to a controller 126 which selectively actuates a stepper motor power supply 128 so as to advance the stepper motor 34 as shown in FIG. 6. In other words, the switch 124 only controls the operation of the stepper motor 34. Automatic feeding of the pultrusion is accomplished using the stepper motor 34 and the switch 124. There are 10,000 steps per one revolution of this particular motor. By varying the number of steps, the lead screw travel can be incrementally controlled. The function of the power supply 128 is simply to receive the signal from the controller and send the needed power to the stepper motor 34.

The pultrusion is rotated at a constant speed using a pultrusion revolution controller 130. This controller allows the revolutions per minute and the direction of revolution of the motor 60 to be changed easily. Thus, the controller sets the direction, speed and acceleration of the motor 60. When operating, the water jet is programmed to start the water stream, the stage 120 then travels approximately ½ inch (1.27 cm) from left to right in FIG. 6. The water jet cuts through the pultrusion and at the end of the stage the water jet shuts off. The stage 120 hits the lever arm of the switch 124 causing the stepper motor 34 to advance the pultrusion the desired amount. The stage 120 meanwhile returns to its original (leftmost) position and the process is repeated.

In one trial of this apparatus, the rod 26 was rotated at 3000 rpm in a clockwise manner when viewed from the catch basin 114. A 4 mil (0.004 inches, 0.01 cm) orifice (jewel) was utilized in the water jet nozzle 110. The water jet pressure was 40K psi (275,000 KPa). The base 30 was reciprocated from right to left when viewed from the catch basin end of the fixture at a feed rate of approximately 10 inches per minute. The nozzle to sample separation distance was on the order of 3 inches (7.62 cm). Disks of 30 mils thickness (0.030 inches, 0.076 cm) were successfully cut from a pultruded rod having a diameter of 73 mils (0.073 inches, 0.185 cm). It was determined that higher packing density carbon fiber rods provided the best results.

Disks were also cut successfully at a rod rotation rate of 4500 rpm. However, the yield was lower than at 3000 rpm. Attempts to cut disks using a 6 mil (0.015 cm) orifice (jewel) for the water jet nozzle were unsuccessful. It is conceivable that a 3 mil orifice can be used for the water jet nozzle. Since no two water jets are exactly alike, slight parameter modifications may be necessary whenever a new water jet system is used. The largest and most probable source of deviation in these parameters appears to be water quality.

Extremely pure water may be advantageous for some uses; however, plain tap water run through a filtration system may be advantageous in that the remaining impurities in the tap water would act as abrasive and perhaps provide cleaner cuts. It is conceivable that an abrasive slurry, such as a fine aluminum oxide, could be used in the water. It is also conceivable that other types of liquids could be used instead of water for a particular application.

Another test has been run utilizing a 9 mil (0.023 cm) orifice and a water pressure of 55,000 psi (379,225 KPa) and a nozzle to pultruded rod separation of less than 1 inch (2.54 cm). Preliminary evaluation of these samples indicate that they are not of as high a quality as those discussed above.

The disclosures of the cross referenced applications, patents and the other references including the Meyer book and the Holm book referred to herein are hereby specifically cross referenced and totally incorporated herein by reference.

The invention has been described with reference to several embodiments. Obviously, modifications and alterations will occur to others upon the reading and understanding of this specification. It is intended to include all such modifications and alterations insofar as they come within the scope of the appended claims or the equivalents thereof.

We claim:

1. An electronic component for making electrical contact with another component, comprising:

a non-metallic pultruded composite member comprising:

a plurality of small generally circular cross section conductive fibers, a polymer matrix in which said plurality of fibers is embedded, said plurality of fibers being oriented in said matrix in a direction substantially parallel to the axial direction of said member and being continuous from one end of said member to the other to provide a plurality of electrical point contacts at each end of said member; and, a means for providing radial strength for said composite member.

2. The component of claim 1 wherein said means for providing radial strength comprises a coating applied to an exterior periphery of said member, said coating comprising a thermoplastic material.

3. The component of claim 2 wherein said coating comprises a polyurethane material.

4. The component of claim 3 wherein said coating has a thickness of approximately 1 to 2 mils.

5. The component of claim 2 wherein said coating comprises a vinyl ester material.

6. The component of claim 5 wherein said coating has a thickness of approximately 3 to 4 mils.

7. The component of claim 5 wherein said coating is curable by ultra-violet light.

8. The component of claim 1 wherein said means for providing radial strength comprises a jacket of a thermoplastic material.

9. An electronic component which is electrically conductive, comprising:

a pultruded composite member comprising:

a plurality of small generally circular cross section conductive fibers, a polymer matrix in which said plurality of fibers is embedded, said plurality of fibers being oriented in said matrix in a direction substantially parallel to the axial direction of said member and being continuous from one end of said member to another end of said member; and, a means for providing radial strength for said composite member.

10. The component of claim 9 wherein said means for providing radial strength comprises a coating applied to an exterior periphery of said member.

11. The component of claim 10 wherein said coating comprises a thermoplastic material.

12. The component of claim 9 wherein said means for providing radial strength comprises a jacket.

13. The component of claim 12 wherein said jacket comprises a thermoplastic material.

14. An electronic component comprising:

a pultruded composite member comprising:

a plurality of small generally circular cross section conductive fibers, a polymer matrix in which said plurality of fibers is embedded, said plurality of fibers being oriented in said matrix in a direction substantially parallel to the axial direction of said member; and, a means for providing radial strength for said composite member.

15. The component of claim 14 wherein said means for providing radial strength comprises a coating applied to an exterior periphery of said member.

16. The component of claim 15 wherein said coating comprises a thermoplastic material.

17. The component of claim 14 wherein said means for providing radial strength comprises a jacket in contact with an exterior periphery of said member.

18. The component of claim 17 wherein said jacket comprises a thermoplastic material.

19. The component of claim 14 wherein said conductive fibers comprise a carbon material.

20. The component of claim 14 wherein a diameter of said composite member is at least twice as large as is an axial thickness of said composite member.

* * * * *